United States Patent
Ku et al.

(10) Patent No.: US 12,034,172 B2
(45) Date of Patent: Jul. 9, 2024

(54) ECO-FRIENDLY POWER SOURCE SUCH AS BATTERY MODULE FOR A TRANSPORTATION VEHICLE

(71) Applicant: SK ON CO., LTD., Seoul (KR)

(72) Inventors: Bon Seok Ku, Daejeon (KR); Tae Gu Lee, Daejeon (KR)

(73) Assignee: SK ON CO., LTD., Seoul (KR)

(*) Notice: Subject to any disclaimer, the term of this patent is extended or adjusted under 35 U.S.C. 154(b) by 0 days.

(21) Appl. No.: 18/319,284

(22) Filed: May 17, 2023

(65) Prior Publication Data
US 2024/0106048 A1    Mar. 28, 2024

(30) Foreign Application Priority Data
Sep. 22, 2022  (KR) .......................... 10-2022-0119991

(51) Int. Cl.
*H01M 50/211*    (2021.01)
*H01M 50/342*    (2021.01)
(Continued)

(52) U.S. Cl.
CPC ..... *H01M 50/211* (2021.01); *H01M 50/3425* (2021.01); *H01M 50/507* (2021.01); *H01M 10/0525* (2013.01); *H01M 50/249* (2021.01)

(58) Field of Classification Search
CPC .......... H01M 50/211; H01M 50/3425; H01M 50/507; H01M 10/0525; H01M 50/249
See application file for complete search history.

(56) References Cited

U.S. PATENT DOCUMENTS 8,329,324 B2 * 12/2012 Lee .................... H01M 50/296
                                                              429/170
8,956,743 B2 *  2/2015 Yang .................. H01M 50/124
                                                              429/53
(Continued)

FOREIGN PATENT DOCUMENTS

EP         4106085 A1    12/2022
KR      10-1492019 B1     2/2015
(Continued)

OTHER PUBLICATIONS

Extended European Search Report for the European Patent Application No. 23181687.7 issued by the European Patent Office on Feb. 20, 2024.

*Primary Examiner* — Michael L Dignan
(74) *Attorney, Agent, or Firm* — IP & T GROUP LLP

(57) ABSTRACT

An eco-friendly power source, such as a battery module for a transportation vehicle includes a plurality of battery cells each including an electrode assembly and an electrode tab protruding from the electrode assembly, and a bus bar assembly coupled to the electrode tabs and connecting the plurality of battery cells. The bus bar assembly includes a main frame having a slit into which the electrode tab is inserted, a bus bar positioned on an outer surface of the main frame and electrically connected to the electrode tab, a plurality of inner frames facing an inner surface of the main frame and spaced apart from each other in a direction in which the battery cells are stacked, and a venting induction portion formed in a concave shape toward the electrode assembly and formed at an upper end portion of at least one of the plurality of inner frames.

19 Claims, 6 Drawing Sheets

(51) Int. Cl.
*H01M 50/507* (2021.01)
*H01M 10/0525* (2010.01)
*H01M 50/249* (2021.01)

(56) References Cited

U.S. PATENT DOCUMENTS

| | | | |
|---|---|---|---|
| 2011/0189514 A1* | 8/2011 | Lee | H01M 50/3425 |
| | | | 429/61 |
| 2015/0093608 A1* | 4/2015 | Seong | H01M 10/0413 |
| | | | 429/56 |
| 2017/0033419 A1* | 2/2017 | Eom | H01M 10/647 |
| 2019/0389318 A1* | 12/2019 | Lee | H01M 50/516 |
| 2020/0335832 A1* | 10/2020 | Lee | H01M 10/4207 |
| 2021/0265699 A1 | 8/2021 | Lee et al. | |
| 2022/0115736 A1 | 4/2022 | Oh et al. | |

FOREIGN PATENT DOCUMENTS

| | | |
|---|---|---|
| KR | 10-1709567 B1 | 2/2017 |
| KR | 10-2020-0077634 A | 7/2020 |

* cited by examiner

ECO-FRIENDLY POWER SOURCE SUCH AS BATTERY MODULE FOR A TRANSPORTATION VEHICLE

CROSS-REFERENCE TO RELATED APPLICATIONS

This application claims the priority benefit of Korean Patent Application No. 10-2022-0119991 filed on Sep. 22, 2022, which is incorporated herein by reference for all purposes as if fully set forth herein.

TECHNICAL FIELD

The present disclosure relates to a battery module. More specifically, the present disclosure relates to an eco-friendly power source, such as a battery module for a transportation vehicle including a plurality of battery cells and a bus bar assembly.

BACKGROUND

A secondary battery is a battery capable of repeating charging and discharging, and is widely used as a power source for portable electronic communication devices such as camcorders, mobile phones, and notebook PCs with the development of information communication and display industries. Recently, a battery pack including secondary batteries has been developed and applied as a power source for hybrid vehicles.

Examples of the secondary battery include a lithium secondary battery, a nickel-cadmium battery, a nickel-hydrogen battery, and the like.

The lithium secondary battery may include an electrode assembly including an anode, a cathode, and a separator, and an electrolyte impregnating the electrode assembly. The lithium secondary battery may further include, for example, a pouch-shaped exterior material accommodating the electrode assembly and the electrolyte.

When a pouch-type lithium secondary battery is exposed to a harsh environment, gas is generated inside the battery to increase a pressure inside a pouch. When the pressure rises above a threshold that the pouch can withstand, a sealing portion at a weakest portion of the pouch may be released, and ventilation (hereinafter referred to as a "vent") may occur. Because the vent randomly occurs in the pouch, it is difficult to predict a location where the vent occurs. Further, when the gas is exhausted, it is difficult to exhaust the gas in one direction.

SUMMARY

One of the objectives of the present disclosure is to provide an eco-friendly power source, such as a battery module for a transportation vehicle capable of predicting, inducing and controlling a vent occurring in a battery cell.

Another object of the present disclosure is to provide a battery module with improved stability.

In order to achieve the above-described and other objects and needs, in one aspect of the present disclosure, there is provided a battery module comprising a plurality of battery cells that each include an electrode tab and are stacked with each other; and a bus bar assembly that is coupled to ends of the plurality of battery cells, from which the electrode tabs are drawn out, and connects the plurality of battery cells to each other, wherein the bus bar assembly includes a main frame including a slit through which each of the plurality of electrode tabs of the plurality of battery cells is drawn out; a bus bar that is mounted on an outer surface of the main frame and electrically connects the plurality of electrode tabs drawn out through the slit; and a plurality of inner frames that are spaced apart from each other on an inner surface of the main frame and guide the plurality of electrode tabs to the slit, wherein at least one of the plurality of inner frames includes a venting induction portion.

According to at least one aspect, the venting induction portion may accommodate a gas expansion portion of the battery cell adjacent to the venting induction portion among the plurality of battery cells.

According to at least one aspect, gas leaking from the battery cell adjacent to the venting induction portion among the plurality of battery cells may be exhausted through the venting induction portion.

According to at least one aspect, the venting induction portion may include a recess portion of the inner frame.

According to at least one aspect, a length (a) of the venting induction portion in a height direction perpendicular to a drawing direction of the electrode tab may be 3% to 45% of a total length of the inner frame.

According to at least one aspect, each of the plurality of battery cells may include an electrode assembly connected to the electrode tab; and a pouch including an accommodation portion accommodating the electrode assembly and a sealing portion sealing the electrode assembly along an outer perimeter of the accommodation portion.

The sealing portion may include a terrace portion sealing an end where the electrode tab is drawn from the electrode assembly to the outside of the pouch; and a side sealing portion sealing one side of the pouch from which the electrode tab is not drawn. The side sealing portion may include a folding portion that is folded at least once.

According to at least one aspect, a part of the terrace portion may be spaced apart from the inner frame.

According to at least one aspect, when gas of the battery cell expands, the part of the terrace portion spaced apart from the inner frame may contact the inner frame.

According to at least one aspect, a cell expansion angle defined by a direction in which an edge of the battery cell adjacent to the inner frame extends diagonally and an extension direction of the electrode tab may be 30° to 60°.

According to at least one aspect, the folding portion may be disposed on the venting induction portion.

According to at least one aspect, the pouch may further include a non-sealing portion formed at other side opposite the one side of the pouch.

According to at least one aspect, the non-sealing portion may be disposed under the venting induction portion.

A battery module according to at least one aspect of the present disclosure includes a plurality of battery cells and a bus bar assembly provided with a venting induction portion and thus can induce gas generated in the battery cells to the venting induction portion. The battery module can also exhaust the gas through the venting induction portion and thus improve stability of the battery module.

The battery module according to at least one aspect of the present disclosure can be provided with a structure optimized for prediction, induction, and control of vent generation. Hence, the battery module can efficiently and easily control the vent inside the battery module.

The battery module according to at least one aspect of the present disclosure can optimize life characteristics and directional venting effect of the battery cells.

BRIEF DESCRIPTION OF THE DRAWINGS

The accompanying drawings, which are included to provide a further understanding of the disclosure and are incorporated in and constitute a part of the disclosure, illustrate embodiments of the disclosure and together with the description serve to explain the principle of the disclosure.

DETAILED DESCRIPTION

The detailed description and specific examples such as embodiments of the present disclosure are given merely by way of example, since various changes and modifications within the spirit and scope of the present disclosure will become apparent to those skilled in the art from the detailed description.

Terms used in the present disclosure are used to explain embodiments and are not intended to limit and/or restrict the present disclosure. A singular expression can include a plural expression as long as it does not have an apparently different meaning in context. In the present disclosure, terms "include" or "have" should be understood to be intended to designate that illustrated features, numbers, steps, operations, components, parts or combinations thereof are present and not to preclude the existence of one or more different features, numbers, steps, operations, components, parts or combinations thereof, or the possibility of the addition thereof. Reference will now be made in detail to embodiments of the disclosure, examples of which are illustrated in the accompanying drawings. The accompanying drawings illustrate embodiments of the present disclosure and are used to help easily understand various technical features, and it should be understood that embodiments presented herein are not limited by the accompanying drawings.

A battery module according to an embodiment of the present disclosure may include a plurality of battery cells and a bus bar assembly provided with a venting induction portion. Thus, a gas generated in a process of operating the battery cells may be guided to the venting induction portion and may be accommodated or exhausted.

Figure 1:
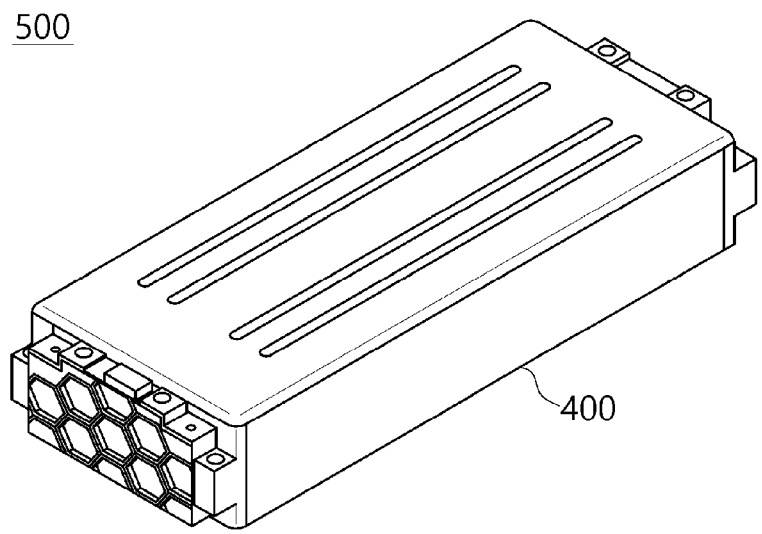
FIG. 1 is a perspective view illustrating a battery module according to an embodiment of the present disclosure.
Figure 2:
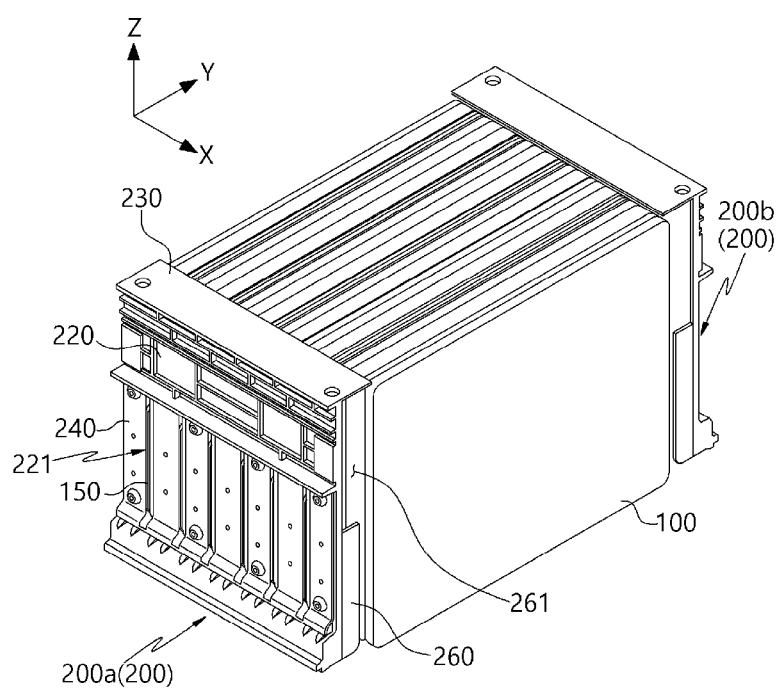
FIG. 2 is a perspective view illustrating an internal configuration of a battery module according to an embodiment of the present disclosure.

FIG. 1 is a perspective view of a battery module according to an embodiment of the present disclosure. FIG. 2 is a perspective view illustrating an internal configuration of a battery module according to an embodiment of the present disclosure.

Referring to FIGS. 1 and 2, a battery module 500 may include a plurality of battery cells 100 and a bus bar assembly 200. The battery module 500 may include a module case 400 in which the plurality of battery cells 100 and the bus bar assembly 200 are accommodated.

The plurality of battery cells 100 may be stacked to form a battery stack. For example, the plurality of battery cells 100 may be stacked in one direction on a horizontal plane. For example, the plurality of battery cells 100 may be stacked in a thickness direction of the battery cells 100. For example, as illustrated in the embodiment of FIG. 2, the battery cells 100 may be stacked adjacent to each other in a horizontal direction X which coincides with the thickness direction of each battery cell 100.

The plurality of stacked battery cells 100 may form, for example, a battery stack. The plurality of battery cells 100 may be electrically connected to each other by the bus bar assembly 200.

The bus bar assembly 200 may include a first bus bar assembly 200a disposed at one end of the plurality of stacked battery cells 100 and a second bus bar assembly 200b disposed at other end of the plurality of stacked battery cells 100.

For example, the first bus bar assembly 200a may be disposed at a front end of the plurality of stacked battery cells 100. The first bus bar assembly 200a may be coupled or connected to a first electrode tab 150a (see FIG. 6).

For example, the second bus bar assembly 200b may be disposed at a rear end of the plurality of stacked battery cells 100. The second bus bar assembly 200b may be coupled or connected to a second electrode tab 150b (see FIG. 6).

The bus bar assembly 200 may include a plurality of components. For example, the bus bar assembly 200 may include a main frame 220, a bus bar 240, and an inner frame 260.

The main frame 220 may include an outer surface and an inner surface that are formed opposite to each other. The inner surface of the main frame 220 may face or contact the battery cells 100.

The bus bar assembly 200 may include a plurality of slits 221. The slits 221 may be formed on the main frame 220 spaced apart from each other at a regular interval along the horizontal direction X. Each of the slits 221 may have an elongated shape in a vertical direction Y also referred to as an up-down direction. Stated differently each of the slits 221 may have an elongated shape in or a width direction of each of the plurality of the battery cells 100. A plurality of slits 221 may be provided or formed. The plurality of slits 221 may be spaced apart and disposed on the main frame 220. For example, the plurality of slits 221 may be arranged in a direction in which the plurality of battery cells 100 are stacked.

The slit 221 may accommodate a portion of the battery cell 100. For example, the slit 221 may accommodate an electrode tab 150 of the battery cell 100. For example, the electrode tab 150 of the battery cell 100 may be inserted into the slit 221. The bus bar 240 may face the outer surface of the main frame 220. For example, the bus bar 240 may be coupled or fixed to the outer surface of the main frame 220.

The bus bar 240 may electrically connect the plurality of electrode tabs 150 drawn out through the slit 221.

The bus bar assembly 200 may be coupled to one side and other side of each of the plurality of stacked battery cells 100. The electrode tabs 150 (see FIG. 6) formed at both ends of each of the plurality of battery cells 100 may be inserted into the slit 221 and pass through the main frame 220. That is, the electrode tabs 150 (see FIG. 6) may be exposed on the outer surface of the main frame 220 and may be electrically connected to each other through the bus bar 240.

In one example, the bus bar assembly 200 may include the inner frame 260. The inner frame 260 may be positioned on the inner surface of the main frame 220. The inner frame 260 may face or contact the inner surface of the main frame 220. Further, the inner frame 260 may be coupled or fixed to the inner surface of the main frame 220.

Figure 6:
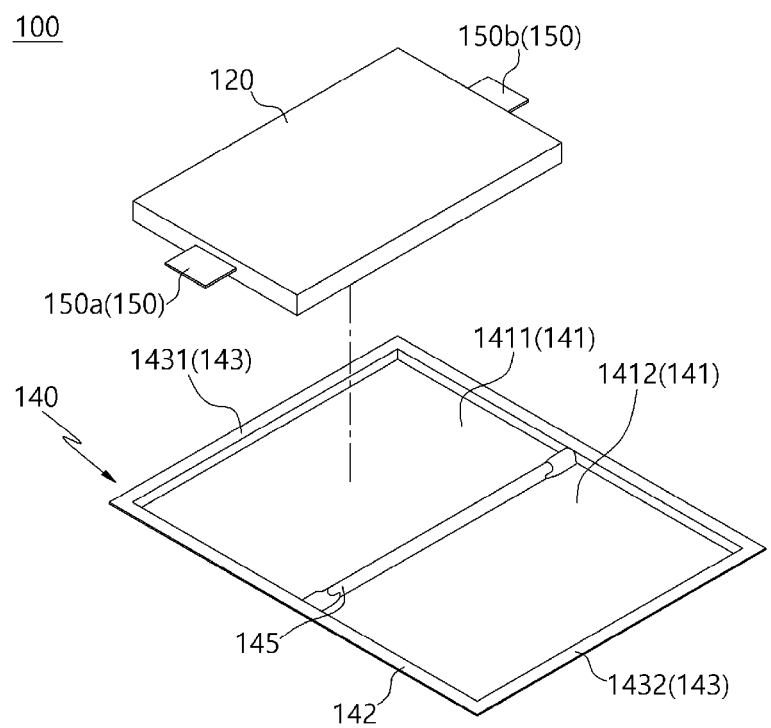
FIG. 6 is a schematic exploded perspective view of a battery cell according to an embodiment of the present disclosure.

As shown in FIG. 6, the inner frame 260 may guide the electrode tab 150. The inner frame 260 may guide the electrode tab 150 to the slit 221.

In another example, a plurality of inner frames 260 may be provided. The bus bar assembly 200 may include the plurality of inner frames 260. The plurality of inner frames 260 may be sequentially arranged while being spaced apart from each other. For example, the plurality of inner frames 260 may be sequentially disposed to be spaced apart from each other in the direction in which the plurality of battery cells 100 are stacked.

The plurality of inner frames 260 may correspond to the plurality of slits 221. For example, a space between two adjacent inner frames 260 among the plurality of inner frames 260 may be connected to or communicate with the slit 221 corresponding to the two adjacent inner frames 260.

The electrode tab 150 may penetrate between the two adjacent inner frames 260 and then may be inserted into the slit 221. During this process, the inner frame 260 may guide the electrode tab 150 to the slit 221.

The bus bar assembly 200 may include a venting induction portion 261. The venting induction portion 261 may be formed on at least one of the plurality of inner frames 260. The plurality of inner frames 260 may be arranged at predetermined intervals along X-axis direction, in which the plurality of battery cells 100 are stacked. For example, the venting induction portion 261 may be formed on at least one of the plurality of arranged inner frames 260, or the venting induction portion 261 may be formed on each of all the inner frames 260. In other words, the number of inner frames 260 on which the venting induction portion 261 is formed is adjustable based on the degree to which the vents are to be controlled in the plurality of inner frames 260.

The bus bar assembly 200 may include an upper frame 230. The upper frame 230 may be coupled or connected to an upper end portion of the main frame 220. The upper frame 230 may form an extended or elongated shape along the X-axis direction, in which the plurality of battery cells 100 are stacked. The main frame 220 and the upper frame 230 may be integrally formed.

Figure 3:
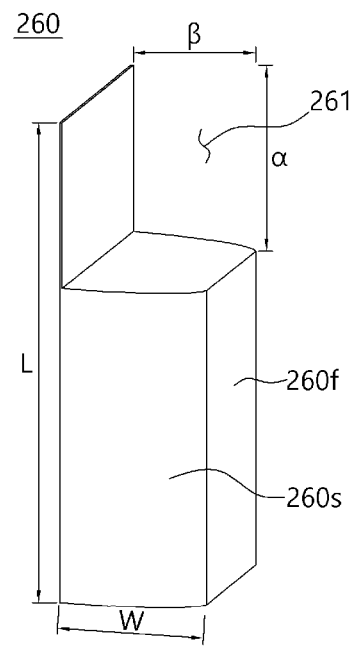
FIG. 3 is a perspective view schematically illustrating an inner frame according to an embodiment of the present disclosure.
Figure 4:
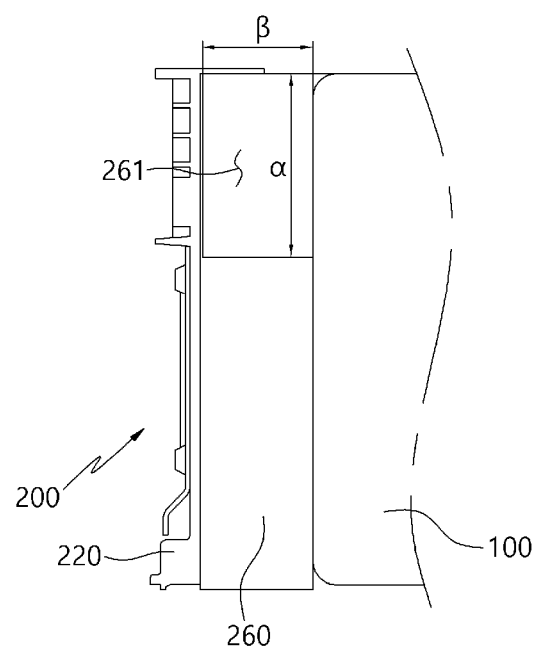
FIG. 4 schematically illustrates a cross section of a battery module illustrated in FIG. 2 taken along a Y-axis direction.

FIG. 3 is a perspective view illustrating the inner frame 260 according to an embodiment of the present disclosure. FIG. 4 schematically illustrates a cross section of the battery module illustrated in FIG. 2 taken along a Y-axis direction.

Referring to FIGS. 3 and 4, the inner frame 260 may include an inner frame facing surface 260f. The inner frame facing surface 260f may be a part of surfaces formed on the inner frame 260. The inner frame facing surface 260f may face an electrode assembly 120. The inner frame facing surface 260f may form a step with the venting induction portion 261.

The inner frame 260 may include an inner frame guide surface 260s. The inner frame guide surface 260s may extend from the inner frame facing surface 260f and lead to the outer surface of the inner frame 260. The outer surface of the inner frame 260 may face or contact the main frame 220.

The bus bar assembly 200 may include the venting induction portion 261. The venting induction portion 261 may be formed in a part of the inner frame 260. For example, the venting induction portion 261 may be formed to be recessed in a surface of the inner frame 260. For example, the venting induction portion 261 may refer to a recessed shape in the inner frame 260. For example, the side of the venting induction portion 261 toward the electrode assembly 120 may be flat, but the disclosure may not be limited in this way. In an embodiment, the shape may be concave. In other words, when looking at the venting induction portion 261 from the electrode assembly 120, the venting induction portion 261 may form a concave shape.

For example, the venting induction portion 261 may be formed to be recessed at an upper end portion of the inner frame 260. Gas leaking from the battery cell 100 may have a relatively high temperature. When the venting induction portion 261 is disposed at the upper end portion of the inner frame 260, gas leaking from the battery cell 100 can be easily exhausted.

For example, the venting induction portion 261 may extend in the up-down direction, i.e., the width direction of the battery cell 100. For example, the up-down direction length 'α' of the venting induction portion 261 may be a length recessed downward in the upper surface of the inner frame 260. The up-down direction length 'α' of the venting induction portion 261 may be 3% to 45% of an up-down direction length 'L' of the inner frame 260. The up-down direction of the venting induction portion 261 may be a vertical direction (Z-axis direction, see FIG. 2). The Y-axis direction in FIG. 2 is the direction in which the electrode tab 150 is drawn out through the slits 221. The X, Y, and Z directions may be orthogonal to each other.

For example, the venting induction portion 261 may have a length β in the longitudinal direction which is the Y-axis direction. The longitudinal direction length β of the venting induction portion 261 may be a length in which the venting induction portion 261 is recessed toward the main frame 220 in the inner frame facing surface 260f.

The longitudinal direction Y may be the longitudinal direction of the battery module 500. See FIGS. 1 and 2. For example, the longitudinal direction length β of the venting induction portion 261 may be a length recessed in a direction, in which the electrode tab 150 is drawn out, in the inner frame facing surface 260f of the inner frame 260. As it can be seen from FIG. 3, in an embodiment, the longitudinal direction length β of the venting induction portion 261 may be 1% to 100% of the longitudinal length W of the inner frame 260.

The venting induction portion 261 formed in the inner frame 260 may accommodate a gas expansion portion 146 (see FIG. 10) of the battery cell 100 adjacent to the venting induction portion 261 among the plurality of battery cells 100. For example, the venting induction portion 261 may accommodate a portion of a pouch 140 of the battery cell 100 expanded by gas.

Gas leaking from the battery cell 100 adjacent to the venting induction portion 261 among the plurality of battery cells 100 may be exhausted through the venting induction portion 261. For example, the gas generated in the battery cell 100 may be accommodated in the venting induction portion 261 to prevent the battery module 500 (see FIG. 1) from being deformed.

When a vent occurs in the gas expansion portion 146 (see FIG. 10) accommodated in the venting induction portion 261, the gas can be exhausted upward. Hence, the battery cell 100 can be previously prevented from exploding. As a result, stability of the battery module 500 can be improved.

In other words, when gas is generated in the battery cell 100 due to thermal runaway or the like, the generated gas may remain in the venting induction portion 261 or may be exhausted upward from the venting induction portion 261. Thus, exhausting upward the gas generated in the battery cell 100 may be induced by the venting induction portion 261.

Figure 5:
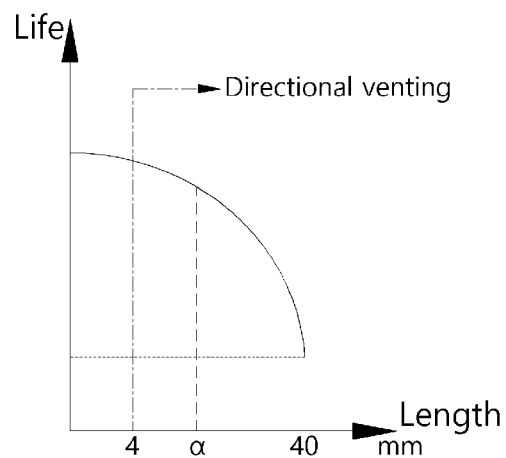
FIG. 5 is a graph illustrating a relationship between a life and a directional venting effect of a battery cell depending on a length of a venting induction portion of a battery module according to an embodiment of the present disclosure.

FIG. 5 is a graph illustrating a life and a directional venting effect of a battery cell depending on an up-down direction length 'α' of the venting induction portion 261 (see FIGS. 3 and 4) of the battery module 500 (see FIG. 1) according to an embodiment of the present disclosure. For example, the up-down direction length 'α' of the venting induction portion 261 may be 3 mm to 50 mm.

Referring to FIGS. 3 to 5, as the up-down direction length 'α' of the venting induction portion 261 increases, life characteristics of the battery cell 100 (see FIG. 2) may be inferior. However, when the up-down direction length 'α' of the venting induction portion 261 is equal to or greater than a specific value (e.g., 3% of a total length of the inner frame), a directional venting effect may appear.

That is, based on the up-down direction length 'α' of the venting induction portion 261, the life of the battery cell 100 (see FIG. 2) and the directional venting have a trade-off relationship.

Accordingly, the up-down direction length "a" of the venting induction portion 261 can be optimized considering the life characteristics of the battery cell 100 (see FIG. 2) and the directional venting effect. For example, when the up-down direction length "a" of the venting induction portion 261 is 3% to 45% of the up-down direction length "L" of the inner frame 260, a combination of the life characteristics of the battery cell 100 (see FIG. 2) and the directional venting effect can be optimized.

For another example, when the up-down direction length α of the venting induction portion 261 is 4 to 40% of the up-down direction length "L" of the inner frame 260, a combination of the life characteristics of the battery cell 100 (see FIG. 2) and the directional venting effect can be optimized.

Figure 7:
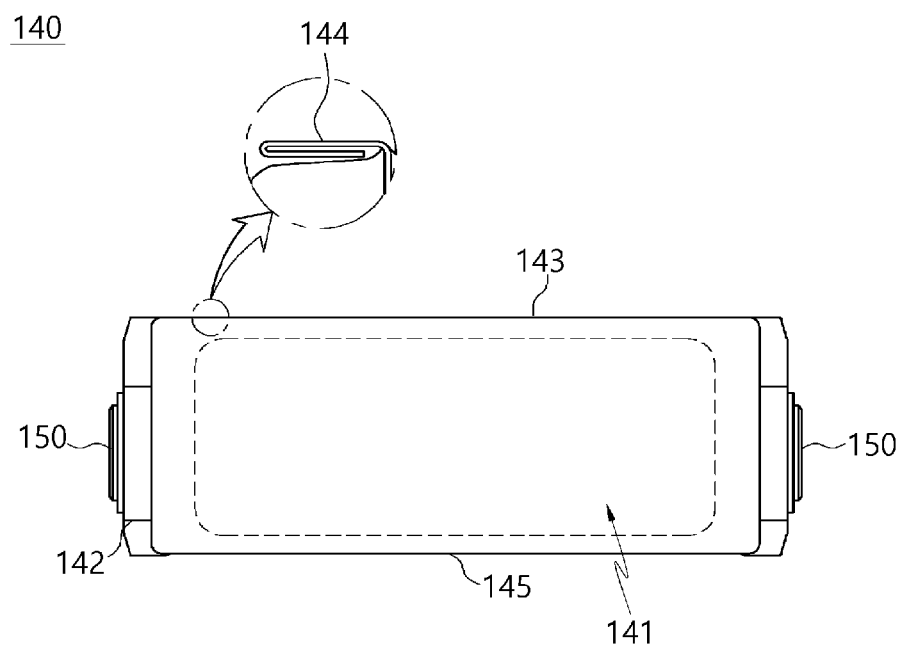
FIG. 7 is a schematic diagram of a battery cell pouch according to an embodiment of the present disclosure.

FIGS. 6 and 7 are a schematic exploded perspective view of a battery cell and a schematic diagram of a pouch of the battery cell according to an embodiment of the present disclosure, respectively. For example, FIG. 6 illustrates a configuration when the pouch 140 is not folded.

Referring to FIG. 6, the battery cell 100 may include the electrode tabs 150 and the electrode assembly 120 connected to the electrode tabs 150. The battery cell 100 may include the pouch 140 accommodating the electrode assembly 120.

The electrode assembly 120 may be formed in a winding type in which one or more anode plates and cathode plates are wound together with a separator, or a stack type in which a plurality of anode plates and a plurality of cathode plates are alternately stacked with separators interposed therebetween, or the like.

Each electrode tab 150 may form a shape protruding from the electrode assembly 120. For example, the electrode tab 150 may protrude forward or rearward from the electrode assembly 120. For example, the electrode tab 150 may include a first electrode tab 150a protruding forward from the electrode assembly 120 and a second electrode tab 150b protruding rearward from the electrode assembly 120.

The pouch 140 may include an accommodation portion 141 accommodating the electrode assembly 120 and sealing portions 143 surrounding the accommodation portion 141 along an outer perimeter of the accommodation portion 141. The sealing portions 143 facing each other may be attached to each other. Through this process, the pouch 140 may be sealed.

For example, the accommodation portion 141 accommodating one or two electrode assemblies may be formed on one pouch sheet. For example, a press process may be performed on one pouch sheet to form the accommodation portion 141 in which one surface of the pouch sheet is concave and another surface is convex.

When the pouch 140 is folded after the electrode assembly 120 is accommodated in the accommodation portion 141, a pair of sealing portions 143 may face each other. The pair of sealing portions 143 facing each other may be formed along at least a part of the outer perimeter of the accommodation portion 141.

After the pouch 140 is folded and the sealing portions 143 is attached, the sealing portion 143 may form at least a part of a perimeter or an edge of the battery cell 100.

A plurality of accommodation portions 141 may be provided. For example, the accommodation portion 141 may include a first accommodation portion 1411 and a second accommodation portion 1412. The first accommodation portion 1411 and the second accommodation portion 1412 may be spaced apart from each other.

The first accommodation portion 1411 may face one surface of the electrode assembly 120 and accommodate a part of the electrode assembly 120. The second accommodation portion 1412 may face other surface of the electrode assembly 120 and accommodate other part of the electrode assembly 120. One surface and the other surface of the electrode assembly 120 may form a thickness of the electrode assembly 120.

When the pouch 140 is folded, the first accommodation portion 1411 and the second accommodation portion 1412 may face each other. For example, when the pouch 140 is folded, the first accommodation portion 1411 may be concave toward the second accommodation portion 1412, and the second accommodation portion 1412 may be concave toward the first accommodation portion 1411.

The pouch 140 may include a connection portion 145. The connection portion 145 may connect the first accommodation portion 1411 and the second accommodation portion 1412. When the pouch 140 is folded and the pair of sealing portions 143 are coupled to each other, the connection portion 145 may form other part of the perimeter or the edge of the battery cell 100.

The sealing portion 143 may be divided into two parts. For example, a first sealing portion 1431 may be formed along a part of a perimeter of the first accommodation portion 1411 and connected to the connection portion 145. For example, a second sealing portion 1432 may be formed along a part of a perimeter of the second accommodation portion 1412 and connected to the connection portion 145.

The pair of sealing portions 143 facing each other may be attached to each other. For example, a pair of sealing portions 143 facing each other may be attached to each other by thermal fusion. For example, the first sealing portion 1431 and the second sealing portion 1432 may face each other and be attached to each other.

The connection portion 145 may come into contact with the electrode assembly 120. On the other hand, the sealing portion 143 may be spaced apart from the electrode assembly 120. Thus, heat generated in the electrode assembly 120 may be transferred to the outside through the connection portion 145. In this context, the connection portion 145 may be referred to as a "non-sealing portion" or a "contact portion."

For example, the connection portion 145 may come into contact with a bottom surface of the module case 400 (see FIG. 1). Thus, at least a part of heat generated in the battery cell 100 may be cooled through the connection portion 145.

Referring to FIG. 7, the pouch 140 may include terrace portions 142 contacting the electrode tabs 150, respectively. Each terrace portion 142 may be a portion of the sealing portion 143 contacting a corresponding electrode tab 150. The terrace portions 142 may be coupled to the electrode tabs 150.

The pouch 140 may include a folding portion 144. The folding portion 144 may be formed by folding a part of the sealing portion 143. The folding portion 144 may be positioned opposite the connection portion 145.

In some embodiments, when the battery module 500 (see FIG. 1) is assembled, the folding portion 144 can prevent an unnecessary space from being formed in the adjacent battery cells 100. The folding portion 144 may be formed to be smaller than the thickness of the electrode assembly 120 so that the folding portion 144 does not extend beyond the battery cell 100 in a thickness direction of the battery cell 100. That is, since no space is generated between the adjacent battery cells 100 and the adjacent battery cells 100 adhere closely to each other, volumetric efficiency can be increased when assembling the battery module 500 (see FIG. 1).

Figure 8:
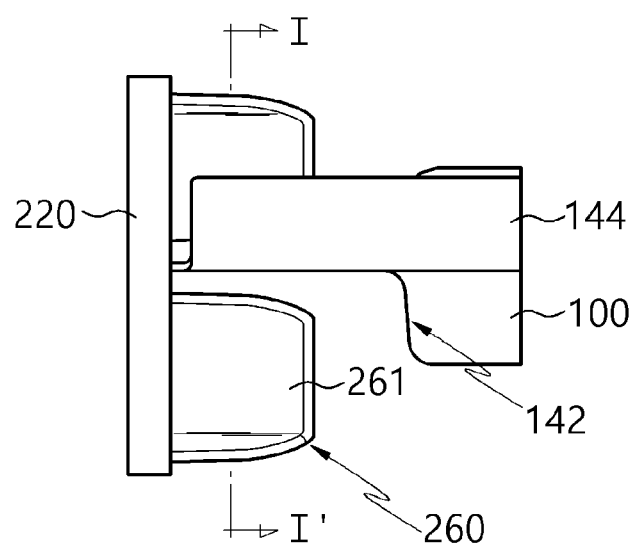
FIG. 8 is a plan view partially illustrating that battery cells are mounted on a bus bar assembly in a battery module according to an embodiment of the present disclosure.
Figure 9:
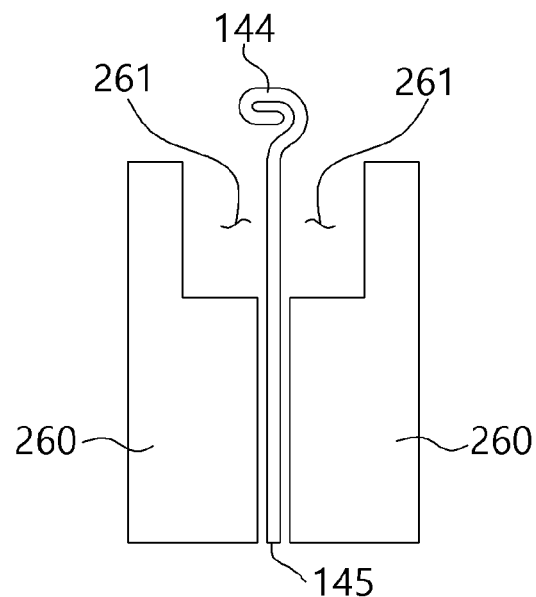
FIG. 9 is a cross-sectional view of a battery module illustrated in FIG. 8 taken along I-I'.

FIG. 8 is a plan view partially illustrating a battery cell mounted on the bus bar assembly in the battery module according to an embodiment of the present disclosure. FIG. 9 is a cross-sectional view of a battery module illustrated in FIG. 8 taken along I-I'.

Referring to FIG. 8, the battery cell 100 may be positioned between the inner frames 260 arranged at a predetermined distance. For example, the plurality of inner frames 260 and the plurality of battery cells 100 may be alternately disposed.

Referring to FIGS. 2 and 8, the electrode tabs 150 of each of the plurality of battery cells 100 may sequentially pass through between both adjacent inner frames 260 and the slit 221 and may be coupled to the bus bar assembly 200.

For example, when the battery cell 100 is disposed between the inner frames 260 of the bus bar assembly 200, a part of the terrace portion 142 of the pouch 140 may be spaced apart from the inner frame 260. A part of the terrace portion 142 may contact the inner frame 260 due to the swelling occurring in the battery cell 100.

The terrace portion 142 may be coupled to the electrode tab 150 formed of a material including metal. On the other hand, the first sealing portion 1431 and the second sealing portion 1432 may be coupled to each other as a polymer. Accordingly, the sealing of the terrace portion 142 may be weaker than the sealing of the sealing portion 143.

For example, the expansion portion 146 (see FIG. 10) may be formed on at least a part of the terrace portion 142. When the swelling occurs in the battery cell 100, the expansion portion 146 (see FIG. 10) may contact the inner frame 260 and may be accommodated in the venting induction portion 261.

Referring to FIG. 9, the folding portion 144 may be disposed above the venting induction portion 261 formed in the inner frame 260. The folding portion 144 may be disposed on the venting induction portion 261 formed in the inner frame 260.

The connection portion 145 may be positioned under the venting induction portion 261. That is, the venting induction portion 261 may be positioned below the folding portion 144 and may be positioned above the connection portion 145. When gas leaks from the battery cell 100 (see FIG. 8), the leaked gas may move to an upper end portion of the battery cell 100 (see FIG. 8) and may be exhausted to the venting induction portion 261.

When a fire occurs in the battery module 500 (see FIG. 1), heat may be propagated to other battery modules (thermal propagation). However, as described above, when vent of flame or gas is controlled in the battery module 500, thermal runaway or fire can be prevented from propagating to battery modules adjacent to the battery module 500 in which the fire occurs.

Figure 10:
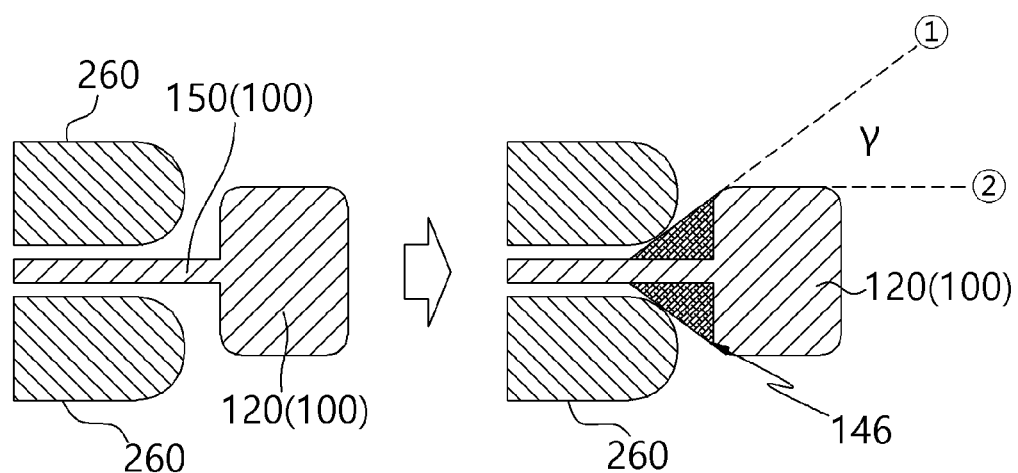
FIG. 10 is a schematic plan view illustrating before and after swelling occurs in a battery cell mounted on a battery module according to an embodiment of the present disclosure.

FIG. 10 is a schematic plan view illustrating before and after swelling occurs in a pouch of a battery cell mounted on a battery module according to an embodiment of the present disclosure.

Referring to FIG. 10, an angle formed by a direction ① toward an edge of the electrode assembly 120 at one point of the electrode tab 150 and an extension direction ② of the electrode tab 150 may be defined as a cell expansion angle $\gamma$. The cell expansion angle $\gamma$ may be 30° to 60°. The directional venting effect can be optimized in the above range.

For example, a first direction ① may be a direction toward an edge of the electrode assembly 120 from a point of the electrode tab 150 that is farthest from the electrode assembly 120 among the electrode tab 150 seen from the edge of the electrode assembly 120. For example, a second direction ② may be an extension direction of the electrode tab 150.

The cell expansion angle $\gamma$ may refer to an angle defined by an extension direction ① of a surface of a part of the expansion portion 146 contacting the inner frame 260 and an extension direction ② of the electrode tab 150.

The pouch 140 (see FIG. 6) may include a metal layer, an outer layer formed on one surface of the metal layer, and an inner layer formed on another surface of the metal layer. For example, the pouch 140 may be provided in a form including an outer insulating layer, a metal layer, and an inner adhesive layer, and may accommodate internal components such as an electrode assembly and an electrolyte solution.

For example, the metal layer of the pouch 140 (see FIG. 6) may include an aluminum thin film. The use of aluminum as the metal layer may be to withstand harsh thermal environments and mechanical shocks while performing a size reduction, a weight reduction, and a thin profile.

For example, the outer layer of the pouch 140 (see FIG. 6) may further include a polymer resin layer, such as polyethylene terephthalate (PET) resin, polyethylene naphthalate (PEN), and nylon resin, outside an aluminum thin film, in order to protect the aluminum thin film from the outside.

For example, the inner layers of the pouch 140 (see FIG. 6) may be attached to each other by thermal fusion at the sealing portion 143 (see FIG. 6). The inner layer of the pouch 140 (see FIG. 6) may include an adhesive layer made of polyethylene (PE), polyolefin such as cast polypropylene (CPP) or polypropylene (PP), or a copolymer thereof for the purpose of attachment between the inner layers.

Young's Modulus of the outer layer of the pouch 140 may be 230 to 280 MPa. For example, when the outer layer of the pouch 140 includes a PET resin, the Young's Modulus may be 230 to 240 MPa. For example, when the outer layer of the pouch 140 (see FIG. 6) includes a nylon resin, the Young's Modulus may be 250 to 280 MPa. In some embodiments, Young's Modulus of the aluminum thin film may be 75 to 95 MPa.

For example, the Young's Modulus may be according to ASTM D638 regulation. For example, the Young's Modulus may be measured with a universal testing machine (UTM) (AG-X plus manufactured by SHIMADZA Corporation).

Referring to FIGS. 1 to 10, when the cell expansion angle γ and the Young's Modulus of the layer included in the pouch 140 satisfy the above range, it is easy to form a space for accommodating gas when the pouch 140 expands, and a direction in which the vent occurs can be predicted or induced in a desired direction. Furthermore, changes in an external appearance of the battery module 500 due to expansion of the battery cells 100 can also be prevented.

The battery module 500 may include the module case 400. The module case 400 may accommodate the plurality of battery cells 100 and the bus bar assembly 200. The module case 400 may form the external appearance of the battery module 500. The module case 400 may include a case body (not shown) forming a seating space and a case cover (not shown) coupled to the case body.

The case body may include an opening communicating with the seating space, and the case cover may be configured to cover the opening. The case cover may include a front cover and a rear cover respectively coupled to the front and rear of the case body. The case cover may include an upper cover coupled to an upper part of the case body.

The battery module 500 may further include a cooling member (not shown), if necessary or desired. The cooling member may be disposed to cover at least a part of at least one of the case body and the case cover. Through this, the battery cell 100 can be cooled in multiple directions. In addition, the cooling member may be freely disposed inside the module case 400, if necessary or desired.

EMBODIMENTS AND COMPARATIVE EXAMPLES

Experiment 1: Measurement of Vent Generation Time

Embodiment 1

A battery cell was charged up to state of charge (SOC) of 96% by charging (CC/CV 0.3 C, 4.2V, 0.05 C CUT OFF).

In order to simulate that the battery cells were stacked between a plurality of inner frames provided with a venting induction portion, the battery cells thus charged were disposed in a chamber so that a portion of a terrace was exposed between two pressurizing jigs in the chamber. A vent generation time was measured with a venting gas sensor while maintaining a temperature inside the chamber at 80° C.

Embodiment 2 and Embodiment 3

Embodiments 2 and 3 were repeatedly carried out twice in the same manner as the embodiment 1.

Comparative Example 1

A battery cell was charged up to state of charge (SOC) of 96% by charging (CC/CV 0.3 C, 4.2V, 0.05 C CUT OFF). The charged battery cell was placed in a chamber, and the time it took for a vent to occur was measured while maintaining a temperature inside the chamber at 80° C.

Comparative Example 2 and Comparative Example 3

Comparative Examples 2 and 3 were repeatedly carried out twice in the same manner as the comparative example 1.

Experimental results of the embodiments and the comparative examples were shown in Table 1. In addition, the total volatile organic compounds (TVOC) and carbon dioxide concentrations checked by the venting gas sensor were shown in FIG. 11.

TABLE 1

|  | Comparative Example 1 | Comparative Example 2 | Comparative Example 3 | Embodiment 1 | Embodiment 2 | Embodiment 3 |
|---|---|---|---|---|---|---|
| Vent generation time (day) | 7.71 | 8.01 | 8.70 | 12.76 | 14.69 | 16.98 |

Although the embodiments have been described with reference to a number of illustrative embodiments thereof, numerous other modifications and embodiments may be devised by those skilled in the art that will fall within the scope of the principles of the present disclosure.

In particular, various variations and modifications are possible in the component parts and/or arrangements of the subject combination arrangement within the scope of the present disclosure, the drawings and the appended claims. In addition to variations and modifications in the component parts and/or arrangements, alternative uses will also be apparent to those skilled in the art. The scope of the present disclosure should be determined by rational interpretation of the appended claims, and all modifications within an equivalent scope of the present disclosure are included in the scope of the present disclosure.

Experiment 2: Life Characteristics

In a battery cell (e.g., SOC of 96%) according to the embodiments 1 to 3 and the comparative example 1, the time it took for the battery cell to reach SOC of 0% was measured. The results were shown in Table 2.

TABLE 2

|  | Embodiment 1 | Embodiment 2 | Embodiment 3 | Comparative Example 1 |
|---|---|---|---|---|
| Life Evaluation | 353 (Hr) | 336 (Hr) | 242 (Hr) | 192 (Hr) |

Figure 11:
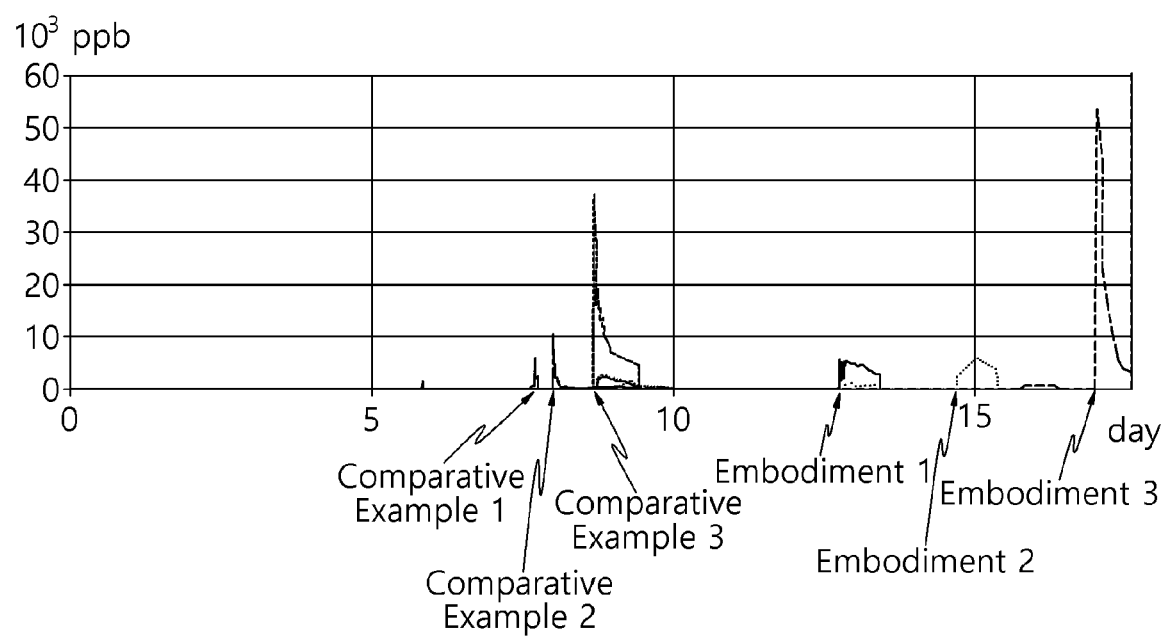
FIG. 11 is a graph illustrating a total volatile organic compound (TVOC) concentration and a total carbon dioxide concentration checked by a venting gas sensor when vent occurs in embodiments and comparative examples.

Referring to Table 1 and FIG. 11, the vent generation time of the embodiments was delayed by at least 4 days compared to the comparative examples. That is, it can be seen that by disposing the battery cell between the pressurizing jigs, the vent of the battery cell can be controlled or the vent can be induced to a specific location when the vent occurs.

The embodiments are also excellent in the life evaluation. Therefore, a battery module with optimized directional venting effect and life characteristics can be designed.

On the other hand, it can be seen that the comparative examples are difficult to control the vent generated in the battery cell and are inferior in the life evaluation.

What is claimed is:

1. An eco-friendly power source, comprising:
   a plurality of battery cells each including an electrode assembly, a pouch accommodating the electrode assembly and an electrode tab protruding from the electrode assembly, the plurality of battery cells being stacked; and
   a bus bar assembly coupled to the electrode tabs of the plurality of battery cells and configured to connect the plurality of battery cells,
   wherein the bus bar assembly includes:
   a main frame having a slit into which the electrode tab is inserted;
   a bus bar positioned on an outer surface of the main frame and electrically connected to the electrode tab inserted into the slit;
   a plurality of inner frames facing an inner surface of the main frame, the plurality of inner frames being spaced apart from each other in a direction in which the plurality of battery cells are stacked; and
   a venting induction portion formed at an upper end portion of at least one of the plurality of inner frames,
   wherein the electrode tab of each of the plurality of battery cells is located between two corresponding adjacent inner frames among the plurality of inner frames,
   wherein the pouch includes a terrace portion coupled to the electrode tab, the terrace portion protruding towards the main frame from the electrode assembly,
   wherein an upper portion of the terrace portion is positioned above the electrode tab and faces the venting induction portion, and
   wherein the plurality of inner frames are located between the main frame and the electrode assemblies of the plurality of battery cells.

2. The eco-friendly power source, such as the battery module for the transportation vehicle of claim 1, wherein each of the plurality of battery cells further includes a gas expansion portion formed at a boundary between the electrode assemblies.

3. The eco-friendly power source, such as the battery module for the transportation vehicle of claim 2, wherein the gas expansion portion faces the venting induction portion, and
   wherein when gas occurs in the battery cell, the gas expansion portion is accommodated in the venting induction portion while swelling.

4. The eco-friendly power source, such as the battery module for the transportation vehicle of claim 1, wherein gas leaking from the battery cell adjacent to the venting induction portion among the plurality of battery cells is exhausted through the venting induction portion.

5. The eco-friendly power source, such as the battery module for the transportation vehicle of claim 1, wherein each of the plurality of inner frames includes:
   an inner frame facing surface facing the electrode assembly; and
   an inner frame guide surface extending from the inner frame facing surface.

6. The eco-friendly power source, such as the battery module for the transportation vehicle of claim 5, wherein the venting induction portion is recessed toward the main frame in the inner frame facing surface.

7. The eco-friendly power source, such as the battery module for the transportation vehicle of claim 6, wherein the venting induction portion forms a step with the inner frame facing surface of the inner frame.

8. The eco-friendly power source, such as the battery module for the transportation vehicle of claim 1,
   wherein the pouch is made of a pouch sheet,
   wherein the pouch includes:
   an accommodation portion accommodating the electrode assembly; and
   a sealing portion formed along an outer perimeter of the accommodation portion, the sealing portion being attached to each other to seal the pouch.

9. The eco-friendly power source, such as the battery module for the transportation vehicle of claim 8, wherein the accommodation portion includes:
   a first accommodation portion facing one surface of the electrode assembly and accommodating a part of the electrode assembly; and
   a second accommodation portion facing other surface of the electrode assembly and accommodating other part of the electrode assembly,
   wherein the pouch further includes a connection portion that is disposed between the first accommodation portion and the second accommodation portion to connect the first accommodation portion and the second accommodation portion.

10. The eco-friendly power source, such as the battery module for the transportation vehicle of claim 9, wherein the sealing portion includes:
    a first sealing portion formed at a perimeter of the first accommodation portion and connected to the connection portion; and
    a second sealing portion formed at a perimeter of the second accommodation portion and connected to the connection portion,
    wherein the pouch is folded at the connection portion, and the first sealing portion and the second sealing portion face each other and are coupled.

11. The eco-friendly power source, such as the battery module for the transportation vehicle of claim 10, wherein the pouch further includes a folding portion that is formed by folding a part of the sealing portion and is positioned opposite the connection portion.

12. The eco-friendly power source, such as the battery module for the transportation vehicle of claim 11, wherein the terrace portion is formed in other part of the sealing portion, and
    wherein at least a part of the terrace portion is spaced apart from the inner frame.

13. The eco-friendly power source, such as the battery module for the transportation vehicle of claim 12, wherein when the battery cell expands by gas, the terrace portion contacts the inner frame.

14. The eco-friendly power source, such as the battery module for the transportation vehicle of claim 11, wherein the folding portion is positioned above the venting induction portion.

15. The eco-friendly power source, such as the battery module for the transportation vehicle of claim 1, wherein the electrode tab includes:
    a first electrode tab protruding forward from the electrode assembly; and a second electrode tab protruding rearward from the electrode assembly, wherein the bus bar assembly includes:

a first bus bar assembly coupled to the first electrode tab; and a second bus bar assembly coupled to the second electrode tab.

16. The eco-friendly power source, such as the battery module for the transportation vehicle of claim 1, wherein the inner surface of the main frame faces the electrode assembly, and wherein the outer surface of the main frame is positioned opposite from the inner surface of the main frame.

17. The eco-friendly power source, such as the battery module for the transportation vehicle of claim 1, wherein the slit extends in an up-down direction.

18. The eco-friendly power source, such as the battery module for the transportation vehicle of claim 1, wherein the electrode tab is sequentially inserted between the two adjacent inner frames among the plurality of inner frames and into the slit.

19. A battery module comprising:

a plurality of battery cells stacked horizontally adjacent to each other, wherein each battery cell includes an electrode assembly, a pouch accommodating the electrode assembly and at least one electrode tab protruding from the electrode assembly; and a bus bar assembly connecting the plurality of the battery cells, wherein the bus bar assembly includes:

a main frame having at least one slit into which the at least one electrode tab is inserted;

a bus bar positioned on an outer surface of the main frame and electrically connected to the electrode tab inserted into the slit;

a plurality of inner frames spaced apart from each other in a direction in which the plurality of battery cells are stacked; and a venting induction portion formed at an upper end portion of at least one of the plurality of inner frames, wherein the electrode tab of each of the plurality of battery cells is located between two corresponding adjacent inner frames among the plurality of inner frames, wherein the pouch includes a terrace portion coupled to the electrode tab, the terrace portion protruding towards the main frame from the electrode assembly, wherein an upper portion of the terrace portion is positioned above the electrode tab and faces the venting induction portion, and wherein the plurality of inner frames are located between the main frame and the electrode assemblies of the plurality of battery cells.

* * * * *